United States Patent [19]

Suzuki et al.

[11] 4,431,566

[45] Feb. 14, 1984

[54] CONVERSION OF METHANOL INTO HYDROGEN AND CARBON MONOXIDE

[75] Inventors: Masaomi Suzuki; Koichi Mizuno, both of Sakura, Japan

[73] Assignee: Director-General of Agency of Industrial Science & Technology, Tokyo, Japan

[21] Appl. No.: 353,106

[22] Filed: Mar. 1, 1982

[30] Foreign Application Priority Data

Mar. 4, 1981 [JP] Japan ................................ 56-30710

[51] Int. Cl.³ .............................................. C01B 3/22
[52] U.S. Cl. ................................................... 252/373
[58] Field of Search ......................................... 252/373

[56] References Cited

U.S. PATENT DOCUMENTS

| | | | |
|---|---|---|---|
| 3,625,665 | 12/1971 | Thompson | 252/373 X |
| 3,920,716 | 11/1975 | Spitz et al. | 252/373 |
| 3,933,446 | 1/1976 | Timmins | 252/373 |

FOREIGN PATENT DOCUMENTS 2046779  11/1980  United Kingdom ............... 252/373

*Primary Examiner*—Howard T. Mars
*Attorney, Agent, or Firm*—Stephen F. K. Yee

[57] ABSTRACT

A gas stream containing methanol is contacted with a catalyst including nickel and potassium supported on an alumina carrier, whereby the methanol is converted into hydrogen and carbon monoxide.

7 Claims, No Drawings

CONVERSION OF METHANOL INTO HYDROGEN AND CARBON MONOXIDE

BACKGROUND OF THE INVENTION

This invention relates to a process for the catalytic conversion of methanol into hydrogen and carbon monoxide.

There are increasing demands for hydrogen and carbon monoxide in many fields and methanol is now an important starting material therefor in that it can give hydrogen and carbon monoxide through catalytic decomposition. In an internal combustion engine, the waste heat generated therefrom can be utilized for the catalytic conversion of methanol into hydrogen and carbon monoxide, the mixed gas product being introduced into the engine as at least a part of the fuel. This method has advantages not only from an economic point of view but also from the standpoint of preventing pollution since the discharge of nitrogen oxides and carbon monoxide may be significantly reduced.

Catalytic conversion of methanol is also utilized in a fuel cell, in which an oxygen-containing gas is supplied to the anode and a fuel, preferably hydrogen, is supplied to the cathode. The reaction between the anode and cathode can produce an electrical energy. The hydrogen may be produced from methanol. Thus, methanol is catalytically converted into hydrogen and carbon monoxide, the latter being further reacted with water to yield hydrogen and carbon dioxide by water gas reaction. The hydrogen obtained in the two-stage process is separated from carbon dioxide for introduction to the cathode.

In addition, hydrogen and carbon monoxide are used in a wide variety of chemical plants. For example, hydrogen is utilized for hydrogenation of organic compounds, hydrotreatment of heavy hydrocarbon oils, etc., and carbon monoxide is utilized for the production of carbonyl group-containing organic compounds.

There is, therefore, a great demand for an effective process capable of converting methanol into hydrogen and carbon monoxide. A process is proposed in which a catalyst containing nickel, lanthanum and ruthenium supported on silica gel is used. Although the catalyst can exhibit a relatively high activity for the decomposition of methanol at an initial stage, the catalytic activity is gradually lowered as the reaction at about 300° C. proceeds and the catalyst is considerably deteriorated after about several hours. A process is also known wherein a catalyst having copper and/or nickel supported on silica gel is used. This catalyst, however, is poor in resistance to heat and, moreover, is defective because with it undesirable by-products such as water and methane are formed at about 400° C. or more. The term "formation of by-products" herein and hereinafter means the case where compounds other than methanol, hydrogen and carbon monoxide are contained in the reaction product in an amount of 10 vol % or more. The formation of by-products requires an additional step for the removal thereof and is not acceptable in practice.

SUMMARY OF THE INVENTION

It is, therefore, an object of the present invention to provide a process which is devoid of the drawbacks of the prior art process.

Another object of the present invention is to provide an effective process by which methanol may be decomposed into hydrogen and carbon monoxide while minimizing the formation of undesirable by-products such as dimethyl ether, methane, water, carbon dioxide and methyl formaldehyde.

It is a further object of the present invention to provide a process in which the catalytic conversion of methanol can be performed in a stable manner for a long period of process time.

In accomplishing the foregoing objects, there is provided in accordance with the present invention a process of decomposing methanol for the production of hydrogen and carbon monoxide, which comprises contacting a gas stream containing methanol with a catalyst including a carrier material of alumina, and nickel and potassium supported on the carrier material. The content of Ni is in the range of about 1-12 mg-atom per one gram of the carrier and the content of K is in the range of about 1-12 mg-atom per one gram of the carrier.

Other objects, features and advantages of the present invention will become apparent from the detailed description of the invention to follow.

DETAILED DESCRIPTION OF THE INVENTION

The process of this invention includes contacting a methanol-containing gas with a catalyst comprised of alumina as a carrier material and nickel and potassium carried on the carrier material.

Any activated alumina may be suitably used as the carrier material. Illustrative of such activated alumina are $\gamma$(gamma)-alumina, $\kappa$(kappa)-alumina, $\delta$(delta)-alumina, $\eta$(eta)-alumina, $\theta$(theata)-alumina, $\rho$(rho)-alumina and $\chi$(chai)-alumina. The alumina carrier preferably has a specific surface area of about 150-300 $m^2/g$.

Supported on the alumina carrier are nickel and potassium. The content of the nickel in the catalyst should fall within the range of about 1-12 mg-atom (i.e. 58.7-704.4 mg) per 1 g of the alumina carrier. An amount of Ni below 1 mg-atom is insufficient to impart practically acceptable activity to the catalyst and, moreover, causes a danger of the formation of by-products. Above 12 mg-atom Ni, the catalytic activity is considerably lowered. The Ni content is preferably about 2-8 mg-atom. The content of the potassium in the catalyst should also fall within the range of about 1-12 mg-atom (i.e. 39.1-469.2 mg) per 1 g of the alumina carrier. An amount of K below 1 mg-atom causes the formation of by-products. Above 12 mg-atom K, the catalyst becomes poor in activity. The K content is preferably about 2-8 mg-atom.

The catalyst of this invention may be prepared in any known manner. For example, a water soluble nickel salt such as nickel nitrate is dissolved in water, with which an alumina carrier material is impregnated. The impregnated material is then dried and calcined in an atmosphere of oxygen. The calcination is preferably conducted while elevating the temperature stepwise from 100° to 500° C. The carrier material thus loaded with nickel is then impregnated with a solution containing a potassium compound such as potassium nitrate. The resulting impregnated material is subsequently dried and calcined in the same manner as described above to obtain a catalyst containing nickel and potassium carried on the carrier material. The catalyst may also be prepared by impregnating a carrier material with a solution containing both nickel and potassium compounds, followed by drying and calcination.

In order to stabilize the catalytic performance, it is preferred that the thus obtained catalyst be subjected to a pretreatment with a reducing gas. The pretreatment, which may be performed either just after the calcination step or before conducting the methanol conversion process, includes heating the catalyst at a temperature of 200°–500° C., preferably 300°–400° C., for 1–15 hours in the atmosphere of a reducing gas such as hydrogen or methanol.

The step of contacting a methanol-containing gas stream with the catalyst is carried out at a temperature of 200°–600° C., preferably 250°–500° C. for 0.1–12 sec, preferably 1–10 sec. The content of the methanol in the gas stream can be 100%. The gas stream may contain an inert gas such as argon or nitrogen, however.

The following examples will further illustrate the present invention.

EXAMPLE 1

Nickel nitrate was dissolved in water to obtain an aqueous solution having a Ni content of 1 g/l. With the solution was impregnated a γ-alumina carrier to obtain nickel-impregnated alumina. The impregnated alumina was dried and calcined at 500°C. for 4 hours to obtain a nickel-carrying alumina having a Ni content of 2 mg-atom per one gram of the alumina carrier. The nickel-carrying alumina was then impregnated with an aqueous solution containing potassium nitrate and having a K content of 1 g/l to obtain an impregnated material. The impregnated material was then dried and calcined in the same manner as above to obtain a nickel and potassium-carrying alumina catalyst having a Ni content of 2 mg-atom and a K content of 2 mg-atom per 1 g of the carrier.

0.5 g of the thus obtained catalyst were packed in a reaction tube having an inner diameter of 9 mm, through which was streamed first a hydrogen gas at 500° C. for 2 hours and then a mixed gas containing methanol vapor (partial pressure: 0.8 atm.) and argon (partial pressure: 0.2 atm.) at a flow rate of 12.4 ml/hour in terms of liquid methanol at 300°–350° C. for 15 hours to stabilize the catalyst performance. After this pretreatment, a feed gas containing methanol vapor (0.5 atm.) and argon (0.5 atm.) was introduced into the reaction tube for contact with the packed catalyst layer at 350° C. for 12 sec. The effluent gas was sampled for analyzing the conversion (decomposition) rate and the composition thereof. The results of the analysis are shown in Experiment No. 1 of Table 1.

COMPARATIVE EXAMPLE 1

Thirteen types of catalysts were prepared using nitrates of the metal components shown in Experiment Nos. 2–14 of Table 1 in the same manner as that in Example 1. The content of each of the catalyst metal components was 2 mg-atom per one gram of the alumina carrier. However, rhodium was contained in an amount of 0.05 mg-atom per one gram of the alumina carrier (Experiment No. 14) and no catalyst metal component was contained in the catalyst of Experiment No. 2. Each catalyst was subjected to pretreatment conditions in the same manner as that in Example 1 and, with the use of the pretreated catalyst, methanol was decomposed in the same manner as that in Example 1. The results were as shown in Experiment Nos. 2–14 of Table 1.

TABLE 1

| Experiment No. | Catalytic metal component | | Conversion of methanol (%) | Composition of product (vol %) | | | | |
|---|---|---|---|---|---|---|---|---|
| | | | | Hydrogen | Carbon monoxide | Dimethyl ether | Methane | Water |
| 1 | Ni, | K | 52 | 65 | 35 | 0 | 0 | 0 |
| 2 | None | | 92 | 0 | 0 | 51 | 0 | 49 |
| 3 | | K | 9 | 4 | 2 | 47 | 0 | 47 |
| 4 | | Ni | 90 | 36 | 20 | 22 | 0 | 22 |
| 5 | Ti, | K | 2 | | | | | |
| 6 | V, | K | 3 | | | | | |
| 7 | Cr, | K | 5 | 70 | 30 | 0 | 0 | 0 |
| 8 | Mo, | K | 4 | | | | | |
| 9 | Mn, | K | 1 | | | | | |
| 10 | Fe, | K | 2 | 70 | 30 | 0 | 0 | 0 |
| 11 | Co, | K | 24 | 67 | 33 | 0 | 0 | 0 |
| 12 | Cu, | K | 5 | 70 | 30 | 0 | 0 | 0 |
| 13 | Zn, | K | 5.5 | 70 | 30 | 0 | 0 | 0 |
| 14 | Rh, | K | 20 | 67 | 33 | 0 | 0 | 0 |

As will be appreciated from the results shown in Table 1, whilst a high methanol conversion is attained when alumina is used by itself as catalyst (Experiment No. 2), the majority of the product is dimethyl ether and water and neither hydrogen nor carbon monoxide is produced. With a catalyst containing potassium alone as catalyst metal component (Experiment No. 3), methanol conversion is significantly lowered and no improvement in selectivity is seen as compared with the case of Experiment No. 2. With a catalyst containing nickel alone as catalyst metal component (Experiment No. 4), on the other hand, undesirable by-products are formed in large amounts. In contrast, the catalyst of the present invention containing both nickel and potassium (Experiment No. 1) exhibits both a high methanol conversion and an excellent selectivity to hydrogen and carbon monoxide. When the nickel is substituted with other metals (Experiment Nos. 5–14), satisfactory conversion is not obtained.

EXAMPLE 2

Methanol decomposition was conducted in the same manner as that in Example 1 except that the pretreatment conditions were varied. Thus, in Experiments Nos. 15 and 16, Table 2 argon and hydrogen were used, respectively, in place of the hydrogen used in the pretreatment step of Example 1. In Experiment No. 17, the pretreatment was carried out by feeding a hydrogen gas to the reaction tube at 310°–350° C. for 15 hours. In Experiment No. 18, the pretreatment was performed by feeding the same mixed gas as used in Example 1 at 300°–350° C. for 15 hours. The results are shown in Table 2, together with those of Experiment No. 1.

TABLE 2

| Experiment No. | Treatment gas | Conversion of methanol (%) | Composition of product (vol %) | | |
|---|---|---|---|---|---|
| | | | Hydrogen | Carbon monoxide | By-products |
| 1 | hydrogen, methanol | 52 | 65 | 35 | 0 |
| 15 | argon, methanol | 79 | 67 | 33 | 0 |
| 16 | oxygen, methanol | 55 | 67 | 33 | 0 |
| 17 | hydrogen | 61 | 64.5 | 35.5 | 0 |
| 18 | methanol | 75 | 68 | 32 | 0 |

The results in Table 2 indicate that pretreatment conditions have an influence upon the activity of the catalyst. It is seen that when the treatment with methanol is to be preceded by the high temperature treatment with other gases (Experiment Nos. 1, 15 and 16), the use of argon is preferable.

EXAMPLE 3

A catalyst having a Ni content of 4 mg-atom and a K content of 4 mg-atom per one gram of alumina was prepared in the same manner as described in Example 1. With the use of this catalyst, methanol was decomposed in the same manner as that in Example 1 except that argon was used in place of hydrogen in the pretreatment step and the catalytic conversion was performed at temperatures of 300° C. (Experiment No. 19) and 430° C. (Experiment No. 20). The results are shown in Table 3.

COMPARATIVE EXAMPLE 2

Using silica gel as a carrier material, two types of catalysts were prepared in the same manner as that in Example 1. One of the catalysts contained nickel as its catalytic metal component in an amount of 4 mg-atom per one gram of the silica gel carrier. The other catalyst contained nickel and potassium each in an amount of 4 mg-atom per one gram of the carrier. With the use of these catalysts, methanol was decomposed in the same manner as that in Example 3. The results are summarized in Experiment Nos. 21–24 of Table 3.

and excellent selectivity to hydrogen and carbon monoxide even at a high temperature (Experiment No. 20).

EXAMPLE 4

Catalysts having the various Ni and K contents indicated in Table 4 were prepared in the same manner as that in Example 1. Tests of catalytic conversion of methanol were carried out with these catalysts in the same manner as described in Example 1 at temperatures of 300°, 350°, 400° and 450° C. The test results were as shown in Table 4.

TABLE 4

| Experiment No. | Content of catalytic metal component (mg-atom/g-alumina) | | Conversion of methanol (%) Reaction temperature (°C.) | | | |
|---|---|---|---|---|---|---|
| | Ni | K | 300 | 350 | 400 | 450 |
| 25 | 0 | 2 | 2 | 9 | 24 | — |
| 26 | 1 | 2 | 29 | 75 | 95 | — |
| 27 | 2 | 2 | 34 | 79 | 98 | — |
| 28 | 4 | 0 | 58 | 83 | 93 | 98 |
| 29 | 4 | 0.5 | 24 | 50 | 74 | 99 |
| 30 | 4 | 1 | 28 | 67 | 98 | 100 |
| 31 | 4 | 2 | 51 | 91 | 100 | 100 |
| 32 | 4 | 3 | 51 | 89 | 99 | 100 |
| 33 | 4 | 4 | 53 | 89 | 98 | 100 |
| 34 | 4 | 5 | 40 | 79 | 96 | 96 |
| 35 | 4 | 6 | 42 | 81 | 96 | 99 |
| 36 | 4 | 8 | 44 | 81 | 96 | 97 |
| 37 | 4 | 12 | 33 | 71 | 94 | 99 |
| 38 | 6 | 2 | 60 | 91 | 100 | 100 |
| 39 | 8 | 2 | 51 | 87 | 100 | 100 |
| 40 | 8 | 8 | 44 | 78 | 93 | 97 |
| 41 | 12 | 4 | 45 | 85 | 100 | 100 |

It will be appreciated from the results in Table 4 that the catalyst containing potassium alone (Experiment No. 25) fails to show practically acceptable methanol conversion activity at any temperatures. Moreover, as shown in Table 1, Experiment No. 3, considerably large amounts of by-products are produced. While the catalyst having nickel alone (Experiment No. 28) can show high methanol decomposition activity, the yield of by-products is very high as shown in Table 1, Experiment No. 4. This is also the case with the catalyst having a K content of 0.5 mg-atom (Experiment No. 29). The other catalysts shown in Table 4 can exhibit practically ac-

TABLE 3

| Experiment No. | Catalytic metal component | Carrier | Reaction temperature (°C.) | Conversion of methanol (%) | Composition of product (vol %) | | | | |
|---|---|---|---|---|---|---|---|---|---|
| | | | | | Hydrogen | Carbon monoxide | Methane | Water | Carbon dioxide | Dimethyl ether |
| 19 | Ni, K | alumina | 300 | 53 | 65 | 35 | 0 | 0 | 0 | 0 |
| 20 | | | 430 | 100 | 59 | 32 | 5 | 0 | 4 | 0 |
| 21 | Ni | Silica gel | 300 | 70 | 62 | 37 | 1 | 0 | 0 | 0 |
| 22 | | | 430 | 100 | 35 | 10 | 27 | 13 | 15 | 0 |
| 23 | Ni, K | Silica gel | 300 | 32 | 70 | 30 | 0 | 0 | 0 | 0 |
| 24 | | | 430 | 100 | 46 | 15 | 15 | 12 | 12 | 0 |

As will be seen from Table 3, the nickel-carrying silica gel catalyst exhibits outstanding activity at 300° C. (Experiment No. 21). With this catalyst, however, when the reaction temperature is raised so as to increase the conversion, the selectivity to hydrogen and carbon monoxide becomes considerably lowered and the yield of by-products increases (Experiment No. 22). This tendency is also observed in the case of the catalyst having both nickel and potassium carried on silica gel (Experiments Nos. 23 and 24). In contrast thereto, the catalyst of this invention can exhibit good catalytic activity even at a low temperature (Experiment No. 19)

ceptable methanol decomposition activity at suitably selected temperatures and can show good selectivity to hydrogen and carbon monoxide. Especially, the catalysts having 2–8 mg-atom each, of Ni and K contents are very advantageous because they can exhibit satisfactory activity at a temperature of 350° C. while substantially preventing the formation of by-products (Experiments Nos. 27, 31–36 and 38–40).

EXAMPLE 5

The same type of catalyst as employed in Example 4, Experiment No. 33, was used in this example. The catalyst was subjected to the same pretreatment conditions as those in Example 4, except that the treatment with the mixed gas was continued for an additional 145 hours, i.e. 160 hours total. Thereafter, a methanol decomposition test was performed in the same manner as that in Example 1 at temperatures of 300°, 350° and 400° C. The results are shown in Experiment No. 42 Table 5 together with those of Experiment No. 33.

TABLE 5

| Experiment No. | Pretreatment time (with methanol) | Conversion of methanol (%) | | |
|---|---|---|---|---|
| | | 300° C. | 350° C. | 400° C. |
| 33 | 15 hours | 53 | 89 | 98 |
| 42 | 160 hours | 50 | 84 | 99 |

The results in Table 5 show that the catalyst used for 160 hours can still exhibit excellent catalytic performance comparable to the catalyst after 15 hours process time. The analysis of the product revealed that the product consisted of 65% of hydrogen and 35% of carbon monoxide. These facts indicate that the catalyst of this invention has a sufficiently long catalyst life.

We claim:

1. A process of decomposing methanol for the production of hydrogen and carbon monoxide, comprising contacting a gas stream containing methanol with a catalyst comprising a carrier material of alumina, and nickel and potassium supported on said carrier, wherein the content of the nickel is in the range of about 1 to 12 mg-atom per one gram of said carrier material and the content of the potassium is in the range of about 1 to 12 mg-atom per one gram of said carrier material.

2. A process as claimed in claim 1, wherein the content of the nickel is in the range of about 2 to 8 mg-atom and the content of the potassium is in the range of about 2 to 8 mg-atom both per one gram of said carrier material.

3. A process as claimed in claim 1, wherein said contacting is performed at a temperature of 200° to 600° C. for a period of 0.1 to 12 sec.

4. A process as claimed in claim 3, wherein said contacting is performed at a temperature of 250° to 500° C. for a period of 1 to 10 sec.

5. A process as claimed in claim 1, further comprising pretreating said catalyst with a reducing gas at a temperature of 200° to 500° C. for 1 to 15 hours before said contacting step.

6. A process as claimed in claim 5, wherein said reducing gas is a methanol- or hydrogen-containing gas.

7. A process as claimed in claim 5, wherein said pretreatment is performed at a temperature of 300° to 400° C.

* * * * *